United States Patent [19]
Froger et al.

[11] Patent Number: 5,123,678
[45] Date of Patent: Jun. 23, 1992

[54] JUNCTION AND SEALING DEVICE HAVING A METALLIC LIP JOINT

[75] Inventors: Guy Froger; Philippe Burgnies, both of Vernon, France

[73] Assignee: Societe anonyme: Societe Europeene de Propulsion, Suresnes, France

[21] Appl. No.: 404,900

[22] Filed: Sep. 8, 1989

[30] Foreign Application Priority Data

Sep. 21, 1988 [FR] France ............... 88 12341

[51] Int. Cl.⁵ ............................................. F16L 17/08
[52] U.S. Cl. ................................... 285/110; 285/286; 285/254; 285/422; 285/917
[58] Field of Search ............... 285/354, 286, 111, 917, 285/422, 110; 403/342; 228/140, 193, 115

[56] References Cited

U.S. PATENT DOCUMENTS

| | | | |
|---|---|---|---|
| 1,485,252 | 2/1924 | Denis | 285/354 X |
| 2,684,255 | 7/1954 | Abele et al. | 285/286 X |
| 2,739,828 | 3/1956 | Schindler et al. | 285/286 X |
| 3,090,630 | 5/1963 | Gasche | 285/917 X |
| 3,142,498 | 7/1964 | Press | |
| 4,597,596 | 7/1986 | Tozer | 285/187 |

FOREIGN PATENT DOCUMENTS

| | | | |
|---|---|---|---|
| 0495356 | 8/1950 | Belgium | 285/286 |
| 0657417 | 6/1965 | Belgium | 285/111 |
| 0467708 | 5/1929 | Fed. Rep. of Germany | 285/111 |
| 1222943 | 4/1959 | France | |
| 1373072 | 7/1963 | France | |
| 2107414 | 9/1971 | France | |
| 0305309 | 6/1971 | U.S.S.R. | 285/354 |
| 0661137 | 11/1951 | United Kingdom | 285/354 |

*Primary Examiner*—Dave W. Arola
*Attorney, Agent, or Firm*—Bryan Cave

[57] ABSTRACT

The device has a first metallic junction element affixed to a first pipe element and a second metallic junction element affixed to second pipe element. One of the junction elements is provided with an elastic lip cooperating with a frontal face provided on the other junction element.

The element provided with an elastic lip has a nozzle element made of a metal or metallic alloy that is compatible from a welding point of view, with the material of the pipe element to which it is joined by welding, and cooperates with a tightening nut, and an end piece having an axial cross-section in the shape of a horizontal u so as to define the said elastic lip, the said end piece being made of a material that is different to that of the nozzle element so as to provide improved mechanical characteristics giving the elasticity that is necessary for the junction, and being affixed to the free end of the nozzle element by diffusion welding.

10 Claims, 2 Drawing Sheets

JUNCTION AND SEALING DEVICE HAVING A METALLIC LIP JOINT

FIELD OF THE INVENTION

The present invention concerns a junction and sealing device having a metallic lip junction for connecting first and second pipe elements, comprising a first metallic junction element affixed to the first pipe element and fitted with a thread cooperating with a thread of a tightening nut, which is itself fitted with a shoulder, and a second metallic junction element affixed to the second pipe element, externally fitted with a shoulder against which comes to bear the corresponding shoulder of the tightening nut, one of the first and second junction elements having an elastic lip cooperating with a frontal face formed on the other of the first and second junction elements.

BACKGROUND OF THE INVENTION

There are several types of known pipe junctions. An example of such a junction is given in document FR-A-2 196 053, which describes an assembly in which one end of a pipe is fixed to an end section fitted with a shoulder and a hemispherical surface, the end of the second pipe being fitted with an external thread cooperating with a nut serving to tighten the elements together. This screw assembly provides both the sealing and junction functions, which could cause problems, especially in cases where there is a high pressure inside the piping.

According to another type of pipe junction, such as described for example in document FR-A-2 284 079, there is provided a deformation of each of the pipe ends, with a flange formed on the male end and an externally threaded taper for the female end. These ends are joined by a nut after prior interposition of an annular sealing junction. Although this type of junction dissociates the sealing and junction functions, it is not applicable to the type of piping used to convey fluids or gas at high pressure, high temperature or under severe operating conditions, e.g. as regards vibrations.

Other types of screw-type metallic junctions are also known, e.g. through French patent FR-A-2 107 414. In this type of junction, the sealing element is, however, in this case not in direct contact with the inside of the piping, and the connection is relatively complex.

There is also known, e.g. through document U.S. Pat. No. 3,142,498, a lipped junction in which the end of one of the pipes to be assembled has a lip forming a sealing junction. In this case, the lip is formed directly in the terminal portion of the piping, and as a result has an elasticity or mechanical resistance that is reduced on account of the fact that the lip must necessarily be made of the same material as used for the pipe.

Document U.S. Pat. No. 4,597,596 discloses a metallic sleeve made of high quality alloy which is fixed to an end of one of the tubes to be joined, e.g. by welding, and which is itself of one-piece construction. The elasticity of the metallic sleeve forming the junction can be fairly large, but the requirement of fixing the sleeve by a single weld in an area of the piping susceptible to receive vibrations for example, restricts the range of usable materials for forming the junction or else makes the assembly fragile.

It has also been proposed to use a junction having a lip made of high-performance alloy and brought onto the tube element by rolling expansion. However, in this case the connection by rolling expansion severely limits the vibration resistance of the connected assembly.

It thus appears that the different known junctions prove to be unadapted to difficult environments i.e. those in which there is a high degree of vibration, or high temperatures, or again where access is difficult for changing junctions, which in turn imposes a very long lifetime on the connecting elements.

SUMMARY OF THE INVENTION

The invention aims to overcome the above-mentioned drawbacks and to provide a high performance junction for use in a hostile environment, in particular in high vibration and high temperature environments.

Another aim of the invention is to provide a self-restricting junction, in which the effect of pressure tends to increase the sealing efficiency.

Finally, the junction according to the invention aims to permit a slight misalignment between the connected pipe.

These aims are achieved by means of a junction device of the type described at the beginning of the specification, characterized in that the element possessing an elastic lip comprises a nozzle element made of a metal or metal alloy that is compatible, from a welding point of view, with a material of the pipe element to which it is joined by welding said nozzle element cooperating with the tightening nut, and an end piece having an axial cross-section in the form of a horizontal U to define said elastic lip, said end piece being formed of a material different to that of the nozzle element in order to offer improved mechanical characteristics providing the required degree of elasticity to the junction, and being made unitary with the free end of the nozzle element by diffusion welding. According to a more specific embodiment, the elastic lip is formed on the second junction element, and the nozzle element has a flange at its terminal portion on which is brought the endpiece, the said flange defining a shoulder cooperating with the shoulder of the tightening nut, which ensures a compression of the connection between the nozzle element and the end piece, this compression having no effect on the deformation of the lip which only depends on the junction. The end piece is fixed to the nozzle element by means of a bimetallic assembly process, such as FE welding, TIG welding, diffusion welding by hot isostatic compression, friction welding, or brazing, the elements of the device being arranged so as to compress said welding between the end piece and the nozzle element, thus improving the reliability of the assembly.

Advantageously, the said frontal face cooperating with the elastic metallic lip has a highly obtuse frusto-conical shape and the elastic metallic lip itself has a frusto-conically shaped external face corresponding to the highly obtuse angle, so as to provide a large contact surface and to allow a slight misalignment between the two pipe elements, the wide-angle cone being locally equivalent to a sphere of large radius.

But the said frontal face cooperating with the elastic metallic lip can also have a spherical shape.

As an example, the end piece is made from an alloy having high mechanical characteristics such as for NC 19 FeNb alloy, known under the name Inconel 718.

The nozzle element can be made of low carbon stainless steel such as X2CN18-10 stainless steel.

The tightening nut and the first metallic junction element can be made of a metallic alloy having good mechanical characteristics such as EZ6NCT 25-15 stainless steel.

BRIEF DESCRIPTION OF THE DRAWINGS

Other characteristics, advantages and details of the invention shall be more clearly understood from the following description of the preferred embodiments, made with reference to the appended drawings in which.

DESCRIPTION OF THE PREFERRED EMBODIMENTS

Figure 1:
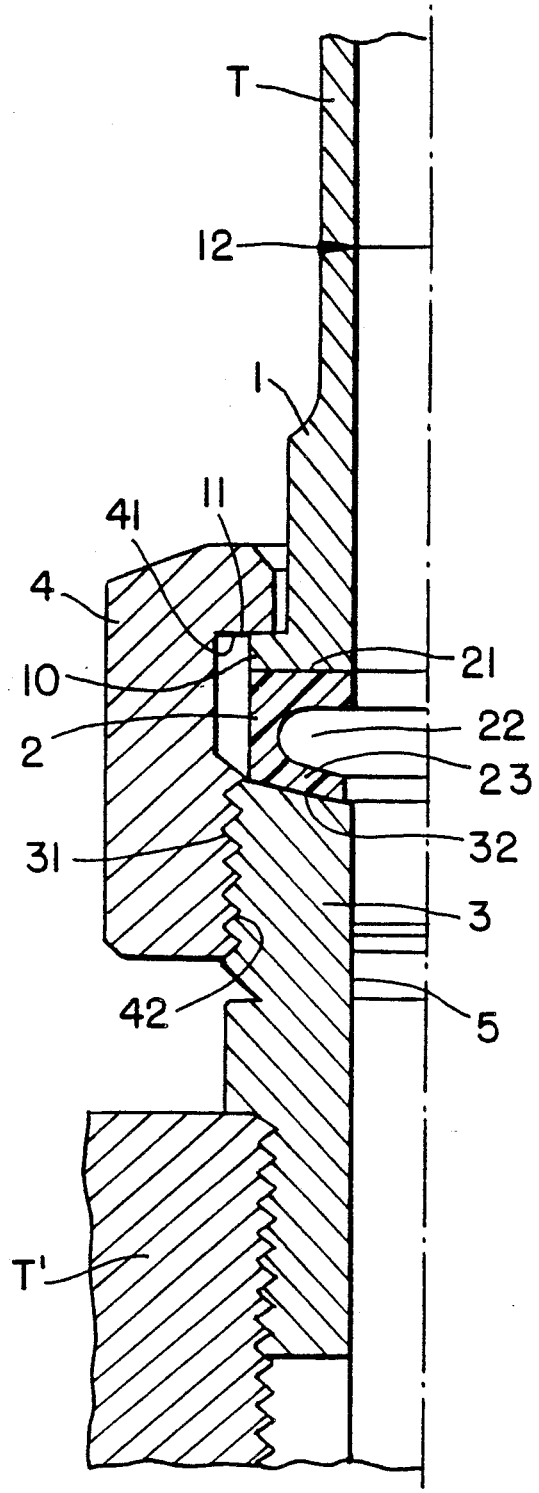
FIG. 1 is an axial cross-sectional view of a first embodiment of the present invention.

FIG. 1 shows a first example of a lipped junction device according to the invention, which comprises a tubular nozzle element 1 having the same inner diameter and made of the same material as the pipe element T to which it is welded at a location 12, by a uniform weld made in a usual manner. At its end opposite the pipe T, the said nozzle element 1 has a bearing flange 10 cooperating, via its face 11, with a shoulder 41 of a tightening nut 4. The material of the nozzle element 1 may not be strictly the same as the material of the pipe element T, but should be compatible therewith from a welding point of view.

An end piece 2 having an elastic lip 23 is diffusion welded on the free end of the nozzle 1. Here, a bimetallic weld 21 is required since the end piece 2 having the lip 23 is made of a material having high mechanical characteristics, such as the NC19FeNb alloy, known by the name Iconel 718, while the pipe elements T, T′ and the nozzle element 1 can be made of a low carbon stainless steel such as Z2CN18-10. The axial cross-section of the end piece 2 has the shape of a horizontal U and thus presents a hollowed out section 22. According to a first embodiment of the invention (FIG. 1), this hollowed portion is turned toward the inside of the piping. This arrangement is better suited to pipes with relatively large internal cross-sections, on the order of several millimeters, as well as in cases where the internal pressure from the pipe is greater than the external pressure, the system then being self-tightening for the junction lip. The end piece 2 is pressed, by its branch defining the elastic lip, against a frontal end surface 32 of a coupling element 3, connected to the pipe element T′ e.g. by a thread or tapping 5, and capable of forming a male union element of a union type junction. The contact surface 32 of the element 3 is frustoconical with a very obtuse angle, but it may alternatively be a spherical frontal surface 32.

The coupling element 3 is an intermediate element between the elastic lip 23 and the second part of the piping T′ and has a threaded portion 31 on its external face which cooperates with the threading 42 of a tightening nut 4 whose shoulder 41 presses against the flange 10 of the nozzle element 1. This allows to both obtain a compression of the elastic lip 23 and maintain the plane of the junction 21 in a compression zone.

Figure 2:
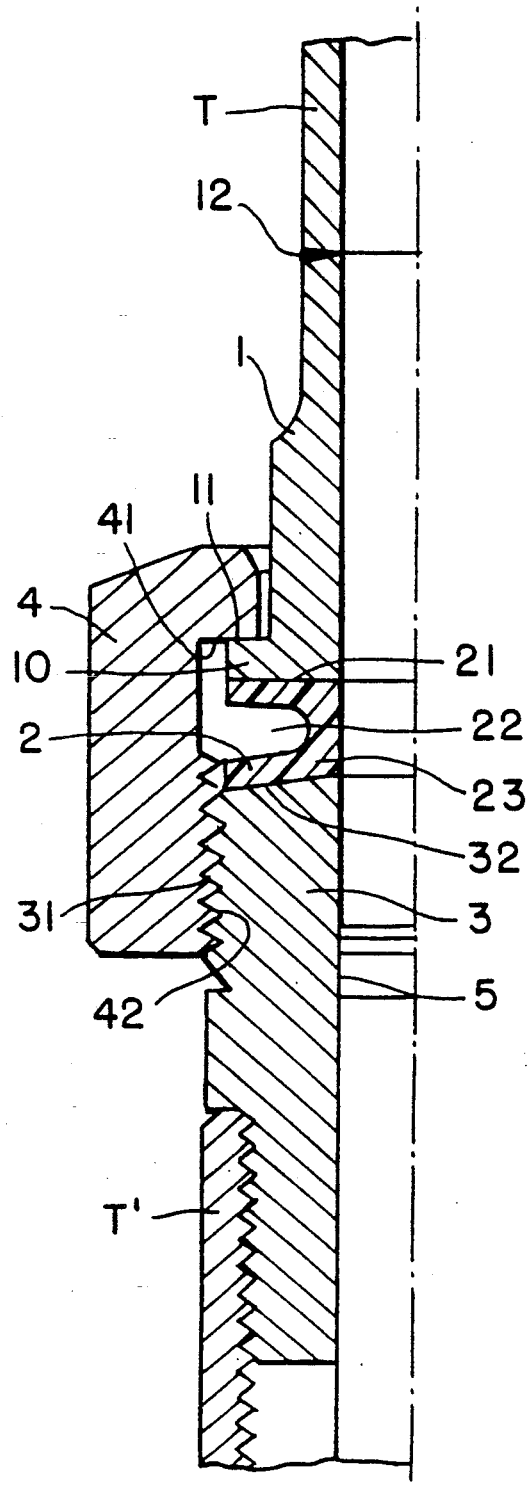
FIG. 2 is an axial cross-section of a second embodiment according to the invention.
Figure 3:
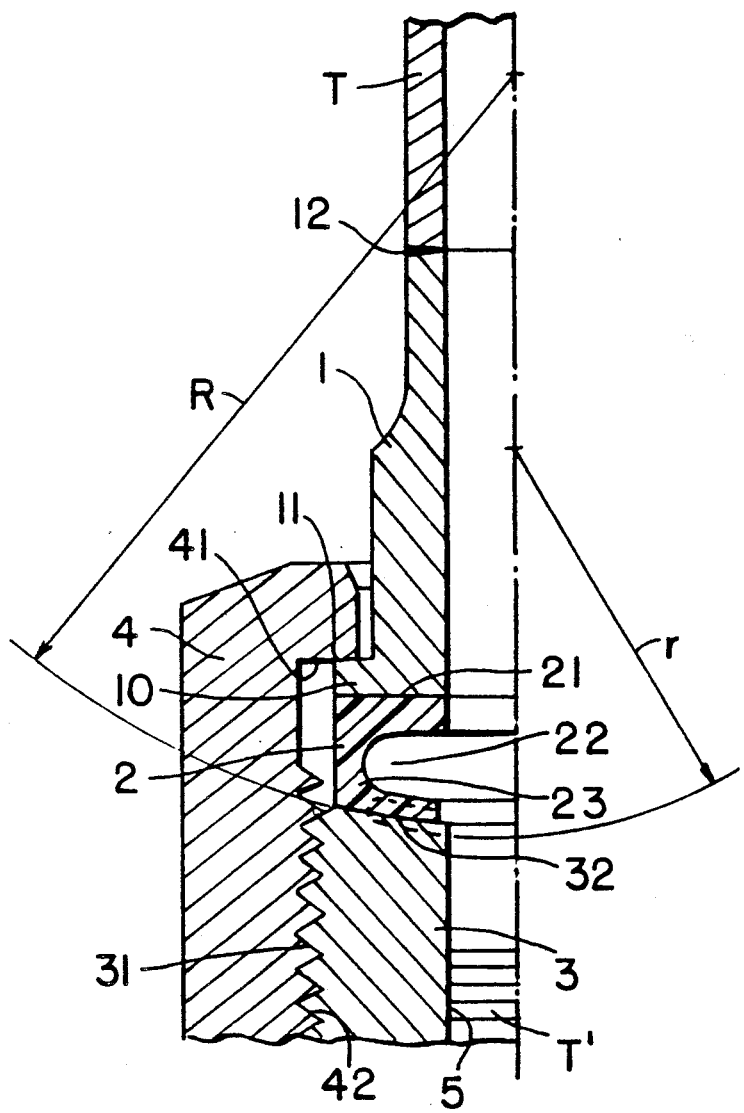
FIG. 3 is an axial cross-section of a third embodiment according to the invention.

For piping having a relatively small internal cross-section, on the order of a millimeter, or again when the external pressure on the piping is greater than the internal pressure, it is preferable to use the configuration shown in FIG. 2, which differs from that of FIG. 1 solely by the orientation of the lip 23. The hollowed portion is no longer turned toward the inside of the piping but rather toward the outside. FIG. 2 shall not be described in more detail since it has the same elements, bearing the same references as on FIG. 1. It shall be noted that when the external pressure on the piping is greater than the internal pressure, the system is self-tightening for the junction's lip.

The two embodiments of the present invention just described offer various advantages. For instance, the sealing efficiency can be obtained thanks to the pressure of an elastic lip 23 on a conical surface 32, or again a spherical surface, which makes the system self-tightening.

The assembly between the elastic lip 23 and the nozzle element 1, provided by a diffusion type bimetallic weld 21, is carried out in a zone that is mechanically compressed by the tightening of the nut 4 between the male part 3 and the female parts 1 and 2 of the junction, which thus guarantees good mechanical resistance to the connection 21, even in a high vibration environment.

A uniform weld 12 is obtained between the pipe T and the nozzle element 1 in a zone removed from the nozzle element 1 which is submitted to vibrations. A uniform classical weld of this type is easily achieved and offers good mechanical resistance which would not otherwise be obtained with a diffusion weld carried out in this working zone, or by a rolling expansion connection.

In the device according to the invention, the sealing and junction functions are dissassociated, whence a better vibration performance. Finally, a slight misalignment between the pipes, on the order of 2 to 3 degrees, is tolerated thanks to the implementation of a lipped junction.

Generally speaking, the junction according to the invention is easily installed, by normal welding 12 of the junction to the piping T, and proves to be highly reliable, in particular owing to the fact that the diffusion welding 21 is compressed by the tightening of the nut 4. Thus, the junction can possess very good mechanical resistance against very high levels of vibration, and also features an excellent resistance to extreme temperatures, for example on the order of 20° K. to 1000° K. Moreover, the high fluid pressures inside the tube tend to increase the sealing owing to a more intimate contact of the lip 23 against the contact surface 32.

Various alternative embodiments of the junction and sealing device according to the invention are possible. For instance, the thread 31 cooperating with the thread 42 of the nut 4 can be made on the external surface of the nozzle 1, in which case the shoulder 41 of the nut 4 would cooperate with a flange provided on the junction element 3 in a similar way to the example of the configuration of FIG. 1 in U.S. Pat. No. 3,142,498. The connection 21 between the nozzle element 1, made of similar material to that of the pipe T, and the end piece 2 would then also be located in a compression zone of the nut 4 (located at an inverted position with respect to that of FIGS. 1 and 2 of the present invention) between the shoulder 41 and the thread 42.

Likewise, the thread 31 of the connecting element 3 can be an internal thread provided on an extension of the element 3 around the end piece 2, and cooperating with an external thread provided on the nut 4 as in the embodiment of the torroidal junctions disclosed in document FR-A-2 196 053, for example.

The construction of the device according to FIGS. 1 and 2 of the present application is particularly simple. In particular, during the manufacture of a device according to the invention, the end piece 2 is affixed to the nozzle element 1 by a diffusion type bimetallic welding, using a hot isostatic compression process.

The various elements of the junction device are also arranged so as to compress the said welding between the end piece 2 and the nozzle element 1, thus increasing the reliability of the assembly.

What is claimed is:

1. A junction and sealing device having a metallic lip junction for joining a first pipe element and a second pipe element, said device comprising a first metallic junction element affixed to said first pipe element and fitted with a thread cooperating with a thread of a tightening nut, said nut and said first metallic junction element having a frontal face being fitted with a shoulder, and a second metallic junction element, affixed to said second pipe element, said second metallic junction element comprising a nozzle element made of a metal that is compatible, from a welding point of view, with the material of said second pipe element to which it is joined at one end by welding, said nozzle element having a shoulder at its other end on which the corresponding shoulder of the tightening nut comes to bear, and a metallic end piece welded to the free end of said nozzle element, said end piece being made of a material different from that of said nozzle element so as to provide improved mechanical characteristics, producing the necessary elasticity to the junction, and said end piece having an axial cross-section in a horizontal "U" shape defining an elastic lip, said elastic lip cooperating with said frontal face on the first junction element so as to be deformed thereby into sealing engagement therewith when said nut is tightened, and wherein said first and second junction elements are positioned so as to compress the weld between said end piece and said nozzle element as said nut is further tightened.

2. Device according to claim 1, wherein the nozzle element has, at its terminal portion, against which is brought the end piece, a collar defining said shoulder cooperating with said shoulder of said tightening nut which thus ensures a compression of the junction between said nozzle element and said end piece, said compression having substantially no effect on said deformation of said lip.

3. Device according to claim 1, wherein said end piece is affixed to said nozzle element by means of a bimetallic welding technique chosen from FE welding, TIG welding, diffusion welding by hot isostatic compression, or brazing.

4. Device according to claim 1, wherein said frontal face cooperating with said elastic metallic lip has a highly obtuse frusto-conical shape and that said elastic metallic lip itself has a frusto-conical external face corresponding to said highly obtuse angle so as to provide a large contact surface and to accommodate for a slight misalignment of the two pipe elements.

5. Device according to claim 1, wherein said frontal face cooperating with said elastic metallic lip has a spherical shape.

6. Device according to claim 1, wherein said end piece is made from alloy NC FeNb known by the name of "Inconel 718".

7. Device according to claim 1, wherein said nozzle element is made of low carbon stainless steel.

8. Device according to claim 1, wherein said tightening nut and said first metallic junction element are made of EZ6NCT 25-15 stainless steel.

9. Device according to claim 1, wherein said end piece having an axial cross-section in a horizontal "U" shape is positioned with the open top end of the "U" shaped end piece turned toward the inside of the pipe so the device is self-tightening when the internal pressure is greater than the external pressure.

10. Device according to claim 1, wherein the end piece having an axial cross-section in a horizontal "U" shape is positioned with the open top end of the "U" shaped end piece turned toward the outside of the pipe so the device is self-tightening when the external pressure is greater than the internal pressure.

* * * * *

UNITED STATES PATENT AND TRADEMARK OFFICE
CERTIFICATE OF CORRECTION

PATENT NO. : 5,123,678
DATED : June 23, 1992
INVENTOR(S): GUY FROGER, et al.

It is certified that error appears in the above-identified patent and that said Letters Patent is hereby corrected as shown below:

On the title page:
In the Abstract, line 12: Change "u" to --U--.

Signed and Sealed this

Fourth Day of January, 1994

Attest:

BRUCE LEHMAN

*Attesting Officer*   *Commissioner of Patents and Trademarks*